United States Patent

[11] 3,621,461

[72] Inventors Charles M. Cason, III;
James F. Perkins, both of Huntsville, Ala.
[21] Appl. No. 857,645
[22] Filed Sept. 9, 1969
[45] Patented Nov. 16, 1971
[73] Assignee The United States of America as represented by the Secretary of the Army

[54] SELF-PUMPED ELECTROADIABATIC LASER
24 Claims, 3 Drawing Figs.
[52] U.S. Cl. .................................................. 331/94.5
[51] Int. Cl. ................................................... H01s 3/09
[50] Field of Search ........................................ 331/94.5

[56] References Cited
UNITED STATES PATENTS
3,487,333  12/1969  Hertzberg et al. ............  331/94.5
3,510,797  5/1970   Nieuwpoort et al. .........  331/94.5
3,514,714  5/1970   Anglebeck ....................  331/94.5

OTHER REFERENCES
Wilson, Nitrogen Laser Action in a Supersonic Flow, 8 App. Phys. Lett., 159–61, Apr. 1966

Primary Examiner—Rodney D. Bennett, Jr.
Assistant Examiner—Daniel C. Kaufman
Attorneys—Harry M. Saragovitz, Edward J. Kelly, Herbert Berl and Harold W. Hilton ABSTRACT: An electroadiabatic laser wherein a plenum chamber is provided in which a thermally heated gas is mixed with a relatively cold gas to provide lasing action. An alkali metal compound is mixed simultaneously with the gases to provide additional stimulation of the ionized gases by releasing additional electrons during mixing of the gases. The expanding gases pass through a nozzle into an excitation chamber wherein the gas flows through a magnetic field between two electrodes, generating a current in an electrode load circuit that is identical to the electron flow in the ionized gases. The flowing gases are further expanded through another nozzle into a larger cavity. A pair of electrodes in the second nozzle have an electric field thereacross for further stimulation of the lasing gas. Lasing action of the gas occurs in the larger cavity, a Fabry-Perot optical cavity, and the output therefrom is coupled out of the cavity by mirrors mounted therein. The gases are then exhausted through a diffuser to atmospheric pressure. A magnet provides the magnetic field in the excitation chamber. The excitation chamber electrode load circuit may be connected to provide the potential across the nozzle electrodes, thus using only the field produced by the magnet to generate the additional potential for further stimulated emission.

PATENTED NOV 16 1971 3,621,461

Charles M. Cason III
James F. Perkins,
INVENTORS.

Harry M. Saragovitz
Edward J. Kelly
Herbert Berl
Harold W. Hilton

BY

SELF-PUMPED ELECTROADIABATIC LASER

BACKGROUND OF THE INVENTION

Lasing action in a laser medium requires a population inversion giving rise to optical gain and optical feedback from the gain that converts the laser amplifier into an oscillator. Population inversion of a laser material is obtained by supplying pumping energy thereto. Pumping energy may be obtained from electrical power sources, as by exciting an electric discharge in the laser material or by light energy which impinges on the laser material to stimulate emission. Another method employed particularly with gas lasers is thermal pumping wherein population inversion results from combining two gases of different temperatures. The nonequilibrium state required for population inversion results from mixing the gases at sufficiently high temperatures to excite a substantial quantity of molecules of the lasing gas to sufficiently high excited states.

The preparation and combination of gases stored at different temperatures is disclosed in a copending application entitled "High Pressure Laser Having Thermal Pumping Means" filed Nov. 27, 1967, Ser. No. 690,045, by Cason et al. Cason et al. disclose apparatus in which a heated gas is mixed with a cold gas for excitation of the cold gas to provide lasing action. The pumping gas is heated in a first housing section and the lasing gas is mixed with the heated gas in a mixing chamber and expanded into a lasing chamber in a second section of housing. Optical feedback in the second section is provided by a pair of mirrors. Output energy is obtained by making one of the mirrors partially transmitting.

When the gases interact in the mixing and lasing chambers, an inversion of population of energy levels in the gases results in lasing action at frequencies corresponding to differences in energies of levels that are partially or fully inverted. These gas dynamic lasers operate with only one method for achieving population inversion. It depends upon adiabatic expansion to yield translational cooling at a rapid rate to maintain energy in the vibrational energy levels. Extremely rapid temperature changes produce a population inversion. It is well known that this works for $CO_2$-$N_2$ mixture with He or $H_2O$ or both added. The heat for producing a population of the laser levels can be supplied by chemical combustion processes or by electric arcs.

SUMMARY OF THE INVENTION

The apparatus of the present invention is an electroadiabatic gas laser in which pumping of the lasing medium is achieved by nozzle expansion of the gases and self-induced electron discharge therein. The fuel or laser gas and the pumping gas are maintained at separate individual temperatures, as in the prior art, and are brought together in a mixing chamber. A suitable fuel and oxidizer may be combined in a combustion chamber to release heat of combustion and produce the excited laser molecules. The gases are stimulated thermally to excited lasing states and adiabatically expanded into an excitation chamber where an electron discharge therein is enhanced. An electron-releasing stimulant may be included with the fuel gas or added to the mixing chamber to produce additional free electrons for more rapid stimulation of the ionized gases.

The hot gases, expanding from the plenum or combustion chamber through a nozzle into the excitation chamber, enter a first electric stimulation region where electric power is derived from the interaction of the flowing gases and an applied magnetic field. A current flow is thereby induced in a load external to the chamber. The potential induced in the load is coupled to a voltage device to provide the potential for developing a second electric stimulation region across the entrance to a lasing chamber. The lasing gas flows into the second electric stimulation region and is further stimulated by application of the self-generated electric power to produce an increase in laser level population energy. The laser energy is then coupled out of the laser chamber. In each chamber, direct excitation of laser levels is due to electron impact with gas molecules.

The adiabatic process produces a small part of the final stored laser energy and the self-generated electric field provides the greater energy gain by a direct stimulation from the electric discharge within the gas. Thus, the stored laser energy in the gas is stimulated by two separate sources within the laser. The conventional chemical or electric arc procedure is of the order of 1 percent efficient. The added energy from electrons by an electronic discharge, near 30–40 percent efficient, produces a minimum overall increase in efficiency of at least one order of magnitude in the gas dynamic laser.

An object of the present invention is to provide a gas dynamic laser which will have an order of magnitude increase in overall operational efficiency, thus being about one-tenth the size of existing systems for comparable laser power output.

Another object of the present invention is to increase the laser inversion density potential of the mixed gases in such a gas laser by adding inversion density potential originated by passing electric current through the excited laser gas.

A further object of the present invention is to generate electric current within the laser for adding the inversion density potential without adding additional electric power from an external source.

DESCRIPTION OF THE PREFERRED EMBODIMENT

Figure 1:
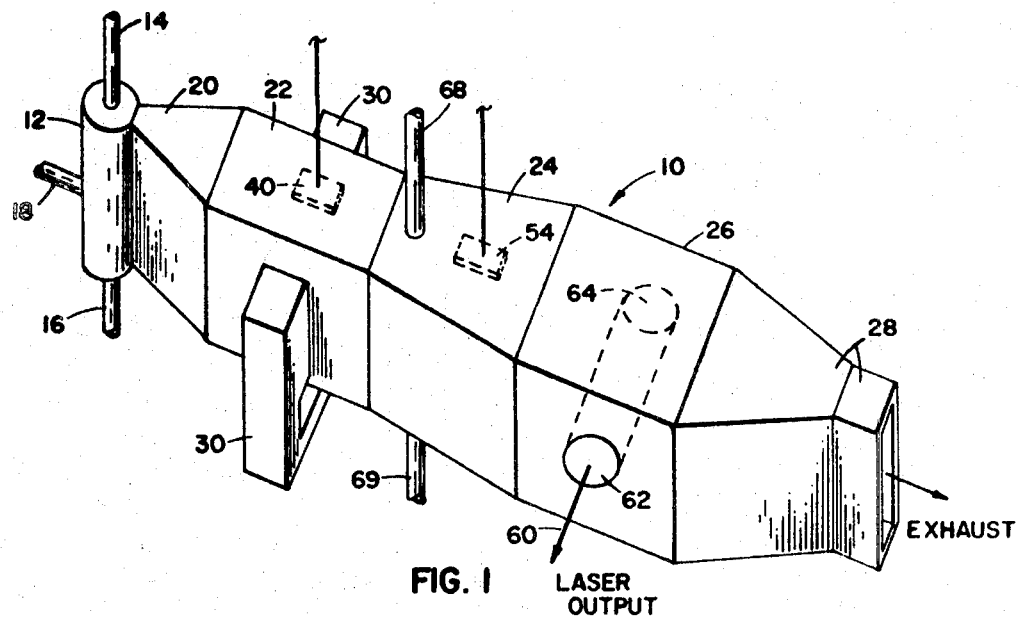
FIG. 1 is an elevational view of a preferred embodiment of the invention.
Figure 2:
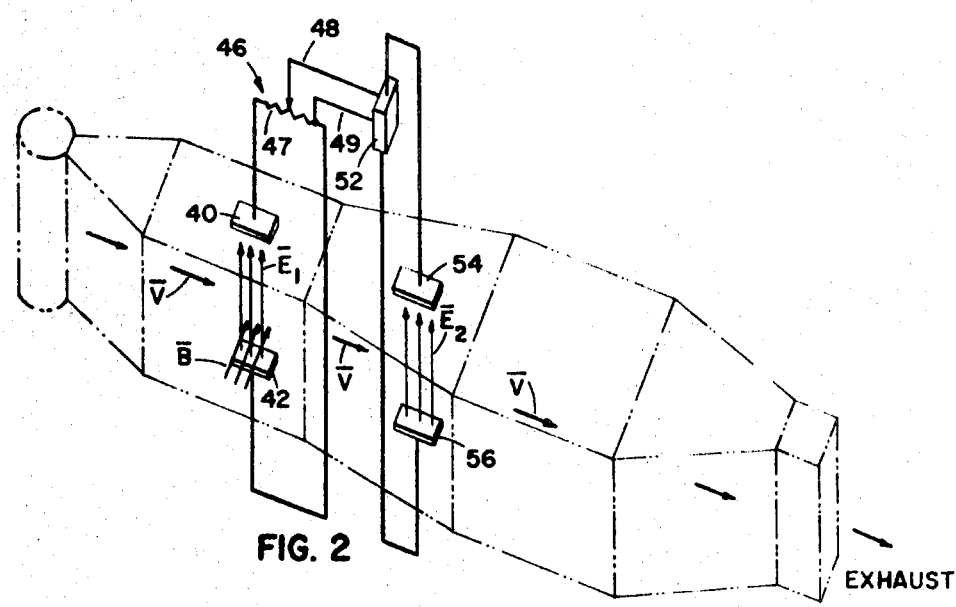
FIG. 2 is a diagrammatic view of the electro magnetic circuitry of FIG. 1.

Referring to the drawings, FIGS. 1 and 2 disclose a preferred embodiment of the invention. Like numerals represent like parts in both figures. In FIG. 1, a laser 10 includes a plenum chamber housing 12 or chemical combustor having input ports 14, 16, and 18 thereto. An output exhaust nozzle 20 expands from chamber 12 to an excitation chamber housing 22. An exhaust nozzle 24 is connected to housing 22 in coaxial alignment with nozzle 20 and on the opposite side of housing 22 from nozzle 20. Exhaust nozzle 24 expands into a Fabry-Perot optical cavity housing 26. A diffusing chamber housing 28 is connected to the optical cavity 26 and is in coaxial alignment with nozzles 20 and 24.

A fuel or laser gas is introduced into plenum chamber 12 through port 14 and combines with an oxidizer or pumping gas introduced to the chamber through port 16. The pumping gas is maintained at a relatively high temperature with respect to the laser gas prior to the combination or mixing of the two in plenum chamber 12. The combined gases expand rapidly through the throat of nozzle 20 and produce supersonic flow through excitation chamber 22. The gases are further expanded by nozzle 24 where they are Additionally translationally cooled by expansion to reduce lower laser level population. The gases then flow through chamber 26 where the lasing output occurs. The gases are recompressed by diffuser 28 and are exhausted to the atmosphere at near atmospheric pressure.

A magnet 30 is aligned to produce a magnetic field within chamber 22. FIG. 2 is a diagrammatical representation of a typical electromagnetic circuit of FIG. 1. The magnetic field vectors of magnet 30 are typically represented by $\bar{B}$. A pair of electrodes 40 and 42 is aligned in parallel planes adjacent opposite interior surfaces of excitation chamber 22. The expanding gases, represented generally by flow vector $\bar{V}$, must flow through magnetic field $\bar{B}$, which is developed between plates 40 and 42. Electrons released by the excited combined gases flow through magnetic field $\bar{B}$ and generate an electric field $\bar{E}_1$ and current flow through electrodes 40 and 42 to a load 46. The electric field is defined by the equation $\bar{E}=\bar{V}\times\bar{B}$, (1) and is a final electric stimulation region through which the gases must flow.

The heat of combustion between gases in chamber 12 yields lasing level excitation of the gases introduced therein. The gases expand through nozzle 20 to produce supersonic flow in excitation chamber 22. Due to the presence of thermally liberated electrons, the gases flowing through excitation chamber 22 have good electrical conductivity. The released electrons stimulate further laser level excitation in chamber 22 and the current flow generated between electrodes 40 and 42 further excites the laser level.

The electric current flow between electrodes 40 and 42 and load 46 is identical to the electron flow in the flowing plasma between the electrodes. With a lasing gas of carbon dioxide, $CO_2$, and a pumping gas of nitrogen, $N_2$, the electrons accelerated through the flowing plasma have a temperature of from 0.7 to 1.3 electron volts (ev). The variations in electron energy depends on gas density and electric current. The excitation produced in the electric stimulation region of chamber 22 adds to the inversion potential already present.

The population inversion density may be further added to by suitably placing an electric field $\overline{E}_2$, a second electric stimulation region, in exhaust nozzle 24. The electric field is generated between electrodes 54 and 56 which are mounted in parallel planes along opposite interior surfaces of the throat of nozzle 24. Since the system already has an inversion of laser levels available, all additional excitation of the flowing gas results in more laser output power in beam 60 coming from the laser cavity. A pair of mirrors 62 and 64 form the Fabry-Perot optical laser cavity within housing 26. Output power from the Fabry-Perot cavity is extracted through partially silvered output mirror 62.

Electric field $\overline{E}_2$ is developed by the voltage supplied from a voltage drive unit 52 connected to electrodes 54 and 56 by a pair of electrical leads. Driver 52 can be powered by an independent source of electric power (not shown) to enhance the inversion potential generated by the conventional gas dynamic laser process, or driver 52 can be powered by the potential developed in load 46. For an independently powered driver 52, suitably placed along the expansion of nozzle 24, it is possible to omit the magnetic field enhancement of excitation chamber 22 and operate at a reduced power output.

Load 46 is generally represented by a variable resistance 47. Resistor 47 has a variable arm, tap 48, that is connected to provide power to drive unit 52. An additional tap 49 of resistor 47 is connected to drive unit 52. The driver 52 is then powered by the potential developed in load 46 and may be adjusted to develop the field strength of $\overline{E}_2$ as desired.

To enhance electrical conduction in the gases, an additional injection of alkali metal compounds can be provided, either in conjunction with the gases through ports 14, 16, or through separate port 18. Any of the alkali metals, cesium, sodium or potassium for example, may be used for adding to the release of electrons in the flowing plasma. Typically, nitrates of cesium are normally soluble in hydrocarbon fuel and may be dissolved therein for addition to chemical combustor 12. Due to the very low work function of cesium, thermally liberated electrons from cesium provide a good electrical conductivity in the flowing gases.

Obviously, the self-pumped laser may operate effectively with either one of the electric fields omitted, or with both fields operating therein. More output power is obtained with both fields in operation than with only one. If both electric fields, $E_1$ and $E_2$ are employed in the laser, the high current density in the electric stimulation region of chamber 22 may adversely affect current flow between electrodes 54 and 56 by bending the current toward chamber 22, the higher current density region. To prevent this adversity, cold laser gas is introduced upstream from electrodes 54 and 56 through input ports 68 and 69. Injection of the laser gas at this point will enhance the laser light output with or without electric excitation. This gas, not being ionized, has no free electrons therein and opposes current flow therethrough. Thus, injection of a controlled amount of the lasing gas into the plasma flow adjacent the electrodes increases the opposition to current flow therethrough and thereby directs the current between the electrodes.

Figure 3:
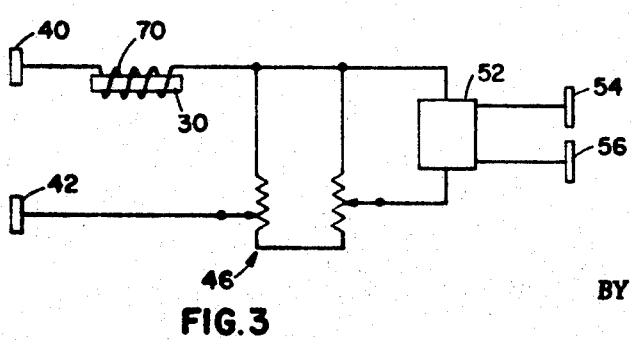
FIG. 3 is a magnetic field generator circuit.

The magnetic field $\overline{B}$ can be generated by a magnetohydrodynamic generator MHD, offering an adjustable magnetic field strength for the laser The load 46 can be a DC-to-DC power converter within the MHD machine. A few windings between the MHD and the load stimulate initial current flow between plates 40 and 42. FIG. 3 shows this magnetohydrodynamic concept wherein a MHD magnet 30 is connected to a seriesed load 46. Load 46, a resistance load-balancing network or control, includes the resistance (not shown) of a magnet excitation coil 70. Coil 70 stimulates initial current between electrodes 40 and 42. An isolation DC-to-DC converter 52 electrically isolates the drive electrodes 40 and 42 from the load electrodes 54 and 56. Converter 52 can contain a DC-to-AC converter connected to an AC-to-DC converter through an isolation transformer to change the power as required for electrodes 54 and 56.

Electrodes 40, 42, 54, and 56 are wall electrodes in contact with the flowing plasma and can be segmented to offset any adversities of the Hall effect. Segmented electrodes would be in essence a parallel set of closely spaced electrodes, each having a lead connected to individual loads. The potential developed across each load is in parallel circuits that supply the driving potential for multiple parallel drivers 52.

The adiabatic process generates the initial laser level pumping action occuring in chambers 12 and 22. The magnetic field causes electric discharge in the electric stimulation region of excitation chamber 22; and through a coupling of power from load 46 to driver 52, the laser pumps itself, generating electric field $\overline{E}_2$ to provide maximum inversion density before the lasing gas reaches the output chamber.

The self-pumped electro-adiabatic laser can be used any place that the ordinary gas dynamic laser is used. Improved efficiency reduces the self-pumped laser to approximately one-tenth the gas dynamic laser (GDL) size for equivalent power lasers. The self-pumped laser can be used, typically, as a LIDAR energy source as compared with RADAR, or in weapon applications where a high-intensity beam of laser energy is required to destroy missiles or aircraft.

Obviously, other gases other than $CO_2$ and $N_2$ and alkali metal additives may be relied upon within the inventive concept. For example, $N_2O$ and $SO_2$ are known to laser in a manner similar to $CO_2$.

I claim:

1. A gas laser comprising: first and second gases for mixing in a ratio to provide coherent laser radiant energy, a plenum chamber having input ports for receiving said first and second gases said gases being partially ionized during mixing thereof, an excitation chamber having first and second expanding nozzles connected at opposite ends thereof, said first nozzle being connected between said plenum chamber and said excitation chamber for allowing said partially ionized gas to expand into said excitation chamber and produce supersonic flow therein, an optical cavity for stimulating the emission of laser output power, said cavity being connected by said second expansion nozzle to said excitation chamber for allowing said gases to expand into said cavity for lasing therein, and a diffuser connected to said optical cavity to recompress said expanded gases for exhaust to the atmosphere at atmospheric pressure.

2. A gas laser as set forth in claim 1 and further comprising first and second electrodes lying in parallel planes adjacent opposite, interior surfaces of said second nozzle for developing an electric field therebetween, and wherein said second nozzle includes first and second input ports mounted adjacent said first and second electrodes, said input ports lying on the upstream side of said electrodes for injecting additional streams of said first gas into the gas flow within said nozzle to enhance laser light output and development of said electric field between the electrodes, said optical cavity includes a Fabry-Perot cavity with mirrors to generate laser action and extract power, and a power source connected across said electrodes to develop the electric field therebetween.

3. A gas laser as set forth in claim 2 wherein said first gas received by said plenum chamber includes an alkali metal compound dissolved in said gas to thermally liberate additional electrons when said first and second gases combine and thereby enhance electrical conductivity of the gases.

4. A gas laser as set forth in claim 3 wherein said first and second gases carbon dioxide and nitrogen, respectively, and wherein said alkali metal compound includes cesium as an electron releasing agent.

5. ages laser as set forth in claim 1 and further comprising means for creating a magnetic field across said excitation chamber to enhance laser level excitation in said chamber, first and second electrodes lying in parallel planes adjacent opposite, interior surfaces of said chamber for developing an electric field therebetween in response to the effect of said magnetic field on said ionized gases, and a load connected across said first and second electrodes to complete an electrical circuit between the electrodes and thereby allow current flow therethrough.

6. A gas laser as set forth in claim 5 wherein said magnetic field means is a magnet having the poles thereof facing each other in planes that are parallel and mutually perpendicular to the planes of said electrodes said magnetic field being developed between the electrodes.

7. A gas laser as set forth in claim 6 and further comprising third and fourth electrodes lying in parallel planes adjacent opposite, interior surfaces of said second nozzle for developing an electric field therebetween, a power source connected across said electrodes to develop the electric field therebetween, and first and second gas input ports adjacent the upstream side of said third and fourth electrodes for injecting additional streams of said first gas into the gas flow within said nozzle in the area of said electrodes to enhance development of said electric field between the electrodes and laser light output.

8. A gas laser as set forth in claim 7 wherein said optical cavity is a Fabry-Perot cavity with mirrors to generate laser action and extract power.

9. A laser as set forth in claim 8 wherein said first or second gas received by said plenum chamber includes an alkali metal compound dissolved therein to thermally liberate additional electrons when said gases combine and thereby enhance electrical conductivity of the gases.

10. A laser as set forth in claim 8 wherein said plenum chamber is a chemical combustor having an additional input port, an alkali metal compound introduced into said chamber through said additional port, simultaneously with the introduction of said first and second gases, combines with said gases to thermally liberate additional electrons and thereby enhance electrical conductivity of said gases.

11. A laser as set forth in claim 10 wherein said first and second gases are carbon dioxide and nitrogen, respectively, and said alkali metal compound includes cesium as an electron releasing agent.

12. A gas laser as set forth in claim 5 and further comprising third and fourth electrodes lying in parallel planes adjacent opposite, interior surfaces of said second nozzle for developing an electric field therebetween, and means connected across said third and fourth electrodes to develop the electric field therebetween.

13. A gas laser as set forth in claim 12 wherein said means connected across said third and fourth electrodes is a variable voltage driving unit for applying a variable potential across said electrodes, and said magnetic field means is a magnet having the poles thereof facing each other in planes that are parallel and mutually perpendicular to the planes of said electrodes, said magnetic field being developed between the electrodes.

14. A gas laser as set forth in claim 13 wherein said optical cavity is a Fabry-Perot cavity with mirrors to generate laser action and extract power, said plenum chamber is a chemical combustor having an additional port, and further comprising an alkali metal compound introduced into said chamber through said additional input port simultaneously with the introduction of said first and second gases for combining with said gases to thermally liberate additional electrons and thereby enhance electrical conductivity of said gases.

15. A gas laser as set forth in claim 14 wherein said first and second gases are carbon dioxide and nitrogen, respectively, and said alkali metal compound includes cesium as an electron-releasing agent.

16. A gas laser as set forth in claim 12 wherein said means connected across said third and fourth electrodes is a voltage driving unit for applying a potential across said electrodes, said load connected across said first and second electrodes is a voltage divider circuit, and further comprising electrical conductive means connecting said voltage divider to said voltage driving unit for providing control of the power thereto.

17. A gas laser as set forth in claim 16 wherein said magnetic field means is a magnet having parallel poles facing each other and mutually perpendicular to the planes of said first and second electrodes for developing said magnetic field between said electrodes, said optical cavity in a Fabry-Perot optical cavity, said plenum chamber is a chemical combustor, and further comprising an alkali metal compound introduced into said chamber with the introduction of said first gas for the thermal liberation of additional electrons to enhance the electrical conductivity of said gases.

18. A gas laser as set forth in claim 12 wherein said means connected across said third and fourth electrodes is a voltage driving unit for applying a potential across said electrodes, said magnetic field means is a magnetohydrodynamic generator for generating a magnetic field between said first and second electrodes along an axis parallel to the planes of said electrodes and perpendicular to an axis common to said electrodes, said load is a DC-to-DC power converter within said generator, and further comprising electrical conductive means connecting said power converter to said voltage driving unit for providing power thereto when an electric field develops between said first and second electrodes in response to ionized gas flow across said magnetic field.

19. A gas laser as set forth in claim 18 wherein said plenum chamber is a chemical combustor, said optical cavity is a Fabry-Perot optical cavity, and further comprising an alkali metal compound introduced into said chamber simultaneously with said first gas for the thermal liberation of additional electrons to enhance the electrical conductivity of said gases.

20. A gas laser as set forth in claim 19 wherein said first and second gases are carbon dioxide and nitrogen, respectively, and said alkali metal compound includes sodium as an electron releasing agent, and further comprising first and second gas input ports adjacent the upstream side of said third and fourth electrodes for injecting additional streams of said first gas into the gas flow within said nozzle in the area of said electrodes to enhance laser light output and development of said electric field between said third and fourth electrodes.

21. A gas laser as set forth in claim 13 wherein said load is a DC-to-DC power converter including additional electrical conductive means connecting said power converter to said voltage driving unit for providing power to said driving unit when an electric field develops between said first and second electrodes in response to ionized gas flow through said magnetic field.

22. A gas laser as set forth in claim 21 and further comprising first and second gas input ports adjacent the upstream side of said third and fourth electrodes for injecting additional streams of said first gas into the gas flow within said nozzle in the area of said electrodes to enhance development of said electric field between said third and fourth electrodes.

23. A gas laser as set forth in claim 22 wherein said magnet is a part of a magnetohydrodynamic generator that develops a variable magnetic field between said first and second electrodes, and further comprising an alkali metal compound introduced into said chamber substantially simultaneously with said first gas for the thermal liberation of additional electrons to enhance electrical conductivity of said gases.

24. A gas laser as set forth in claim 23 wherein said power converter is coupled to said generator by coil windings for receiving additional supplemental power therefrom for controlling said voltage driving unit, said plenum chamber is a chemical combustor, said optical cavity is a Fabry-Perot optical cavity, said first and second gases are carbon dioxide and nitrogen, respectively, and said alkali metal compound includes cesium as an electron-releasing agent.